3,063,807
PURIFICATION OF WATER-INSOLUBLE SOLIDS BY ION EXCHANGE

Lester A. Kenworthy, Baltimore, Md., assignor to The Glidden Company, Cleveland, Ohio, a corporation of Ohio
No Drawing. Filed Feb. 23, 1960, Ser. No. 10,100
7 Claims. (Cl. 23—202)

This invention relates to purification of water-insoluble solids such as hydrous oxides of titanium by ion exchange resins. The invention is directed more particularly to the removal of ion exchangeable impurities from solid pigmentary materials by an economical and efficient process.

In the manufacture of titanium dioxide by the conventional $TiO_2$-sulfate process, a titanium ore, slag, or mixtures thereof, is first attacked with sulfuric acid and the soluble constituents are separated from the insoluble by settling, filtration and polishing to obtain a stock titanium sulfate solution. The titanium sulfate solution is thereafter hydrolyzed and the impurities in solution are removed by filtration and washing. The titanium hydrate resulting from the hydrolysis, filtration, and washing steps contains certain ionizable impurities which adhere to the surface for example Cr, V, W, Ni, MO, $PO_4^=$, $SO_4^=$, etc. These and other ionizable impurities adhere tenaciously to the titanium hydrate due to its surface activity and repeated washing only removes them to a tolerable degree. Although these ionizable impurities are present, after washing, only in minute quantities, they nevertheless, influence the properties of the pigment to a great degree. (See L. G. Stonehill, "Chemist Analyst," vol. 47, No. 3, pages 68–9.)

In the conventional $TiO_2$-sulfate process the hydrolyzate from the titanium sulfate solution, after removal of the majority of the soluble impurities by filtration and washing (hereinafter referred to as the first acid cake of titanium hydrate), is treated as a slurry usually hot, with fresh sulfuric acid, agitated and followed by filtration and additional washing (hereinafter referred to as the second acid cake of titanium hydrate). The ion exchangeable impurities present in this second cake of titanium hydrate although reduced in magnitude are difficult to remove and continued washing becomes ineffective in their removal.

Tanner and Caumenberg in U.S. Patent 2,842,428 teach a method for preparing purified titanium dioxide pigment by the process of converting the titanium hydrate to alkaline form, and then washing. This procedure, while effective in removing soluble impurities, requires redigestion in acid, reprecipitation, filtering and washing, all of which adds to the processing costs. I have succeeded in purifying pigmentary solids by an economical process as will be described herein below.

A broad object of my invention is the provision of a process for purifying water-insoluble solids contaminated with ion exchangeable impurities.

A more specific object of my invention is to provide an economical process for purifying titanium hydrate. Other objects will be apparent from the description and examples of this invention which are offered to illustrate the process and the efficiency thereof in the treatment of titanium hydrate according to the teachings herein.

I have found that I can treat a water-insoluble solid to purify it from adhering ion exchangeable impurities by contacting said water-insoluble solid, titanium hydrate being illustrative, with an ion exchange resin under appropriate conditions of time, contact and temperature and separating the resin from the thus-treated solid. Subsequent to this purification, in the instance of titanium hydrate, a precalcination treatment followed by special finished treatments yields a clean pigment of substantially completely negative impurities and eminently suitable for many commercial uses.

Although the process of this invention is applicable to the purification of water-insoluble solids contaminated with ion exchangeable impurities, reference will be made hereinafter largely to pigmentary solids.

The process of contacting water-insoluble solids with ion exchange resins for the purpose of removing tenaciously held ion exchangeable impurities applies to titanium-containing compositions as well as to cadmium, white lead, mercury, etc., that is, any water-insoluble, or pigment-yielding solids which are contaminated with hard to remove ion exchangeable impurities. More specific reference will be made hereinafter to titanium-containing materials such as titanium hydrates or pigments such as $TiO_2$ whether rutile or anatase, and examples will be presented showing the effect of the treatment according to the processes of this invention to such titanium materials.

Titanium hydrate acts as an adsorbent for ionic materials in solution. In an acid solution, for example, the hydrate will absorb anions (and some cations depending on type, acidity, etc.), whereas in the alkaline solution it will absorb cations. In acid solution the hydrate will therefore adsorb metal ions as anionic complexes, due at least partly to this ability of the hydrate to behave differently in acid or alkaline solutions. The filtered and washed hydrolysis product (acid cake) also contains on the order of 8 to 10% adsorbed sulfuric acid depending on the conditions of hydrolysis, no matter how extensively washed with water. In addition to this adhering sulfuric acid, the titanium oxide solid contains slight but undesirable ion exchangeable impurities such as Cr, V, phosphates, etc.

Ion exchange is a phenomenon whereby, under appropriate conditions, a highly active ion connected, attached, or bonded to a relatively inactive nucleus (ion exchange resin) can be exchanged for another active but different ion in solution. If the resin is in the anionic (OH) form, free acid can be neutralized without salt formation in solution, one reaction product being the readily separated but now exhausted resin, the other water and, in the instance of this invention, the water-insoluble solid. If the resin is in the cationic (H) form, a base can likewise be neutralized. Thus when a salt in solution is treated with a resin it is split, yielding a free base or a free acid depending on whether the resin used is anionic in (OH) form or cationic in (H) form.

In general, for ion exchange to take place, the compounds must be soluble and ionized. According to the findings and teaching concerning this invention, however, the ion exchangeable impurities adhering to titanium hydrate and substantially unremoved by washing can be exchanged by treatment with an ion exchange resin. In the instance of this invention, since large effective surfaces are involved, and since the process concerns an interaction of solids, the ion exchange reaction requires more time to reach equilibrium than with simple solutions of ions. Diffusion is also important and since this process is affected by temperature, the reaction rate (ion exchange rate) can be increased by using the highest temperatures recommended for the resin, that is, from about room temperature to about 70° C. or higher for a resin containing sulfonic acid groups in the matrix and from about room temperature to about 38° C. for one containing amine groups.

From the foregoing it is evident that I can employ a cation or anion exchange resin in the treatment of water-insoluble materials, e.g., titanium hydrate, with first an anion exchange resin and then treat the resulting aqueous slurry containing titanium hydrate with a cation exchange resin. I have found that by treatment in accordance with this invention I can obtain a purified titanium oxide pigment of very high quality and purity.

The ion exchange resins applicable in the process of this invention are anion and cation exchange resins in the hydroxyl (anion), hydrogen (cation), or salt form, e.g., sodium (cation), chlorine (anion) etc. The ion exchange resins applicable herein can be prepared according to Example 1 of the D'Alelio Patent U.S. 2,366,007. Ion exchange resins prepared in accordance with the method disclosed by D'Alelio are available commercially, one such resin sold under the trademark "Dowex 50." Ion exchange resins prepared according to this method can be visualized as having an elastic, three-dimensional hydrocarbon net work containing ion active groups. The network is prepared from a copolymer of styrene and divinylbenzene, the latter serving as a cross-linking agent and also to form a three-dimensional structure. By employing different functional groups different types of ion exchange resins can be produced. Thus sulfonation of the copolymer yields a strongly acidic resin which will exchange cations; chloromethylation, followed by amination produces a basic resin which will exchange anions. The degree of acidity or basicity of the final resin produced is controlled by using different functional groups. For example, if the resin is aminated with trimethylamine, the resin will have quaternary ammonium groups and is strongly basic; amination with N,N-dimethylethanol amine results in a somewhat less basic resin. "Dowex 1 and 21K" are illustrative brand names of anion exchange resins of the quaternary ammonium type, $-N(CH_3)_3^+$ (referred to as Type I); whereas "Dowex 2" is representative of the N,N-dimethylethanol amine type, $-N(CH_3)_2 (C_2H_4OH)^+$ (referred to as Type II). Amination can also be conducted wtih mixtures of aliphatic polyamines to yield weaker basic resins containing a mixture of primary, secondary, and tertiary amine groups ("Dowex 3").

The cation exchange resins, applicable in the process of this invention can contain nuclear sulfonic acid groups ($-SO_3H$), methylene sulfonic ($-CH_2SO_3H$), etc. others include phenolic, phosphonic, carboxylic and the like. The teachings of U.S. Patents 2,366,007, 2,341,907, 2,591,574, 2,591,573, 2,614,099 which concern the preparations of various cation and anion exchange resins are incorporated herein by reference. Reference is also made to a description of the fundamental properties of nuclear sulfonic acid resins in Ind. and Eng. Chem. 39, 2830 (November 1947), and to Kunin and Myers, "Ion Exchange Resins," 1950, J. Wiley and Sons, Inc.

The ion exchange resins of commerce employed herein are usually supplied in the standard 50 to 100 mesh size designation and are supplied in either the hydrogen or sodium form (cation) or hydroxyl or chlorine forms (anion). (See Product Bulletin 103, J. T. Baker Chemical Co.)

The present invention is specifically concerned with the treatment of a heterogeneous system, that is, a system wherein titanium is present as a hydrate or as an oxide in the form of an aqueous slurry and where an ion exchange resin is added to the system or the slurry is passed through a bed of ion exchange resin in a column and the mixture is agitated when in slurry form, at an appropriate temperature and for a suitable time which can vary from say 5 minutes to several hours. In view of the fact that ion exchange resin capacity varies according to type, it is difficult to define the amounts of resin to be used per amount or volume of slurry of solids, but generally about two milliequivalents per milliliter of wet resin is an approximate figure, more ion exchange resin can be employed to get more complete or faster ion exchange rate. Redistribution of the ion exchangeable impurities takes place between the two solids, $TiO_2$ and the resin, and then the resin is physically separated either by known methods, such as screening or by hydroclassification (see Chem. Eng., 65, No. 11, page 54). The $TiO_2$ goes to its next processing step and the resin, if exhausted, is regenerated for further use or reused if not exhausted.

When the active sites of the ion exchange resin are saturated, the exhausted resin is no longer suitable for ion exchange purposes and must be regenerated. This is done in the conventional manner of which a number of alternatives exist. Hydrochloric or sulfuric acid will serve for regenerating cation exchange resins while sodium or potassium hydroxide will serve for regenerating the stronger basic Types I and II anion exchange resins and ammonium hydroxide for polyamine anion exchange resins. If resins in the salt form are employed this would result in substitution of (Cl) instead of (OH) for the undesirable anions and (Na) instead of (H) for the undesirable cations. Ammonium hydroxide, though not suitable for regeneration of the strongly basic anion exchange resins, is adequate for the polyamine anion exchange resins which remove strong acid just about as well as the others. In this last case ammonium sulfate can be salvaged with high ammonia efficiency.

In the examples to be offered hereinafter, ion exchange resin treatments were made on the following:

(1) Uncalcined $TiO_2$—
    (A) 1st acid cake (rutile-yielding)—e.g. first filtration and washing of the hydrolysate;
    (B) 2nd acid cake—e.g. acid ($H_2SO_4$) treated, fiirst acid cake after filtering and further washing,
        (1) Anatase-yielding,
        (2) Rutile-yielding
        (3) Titanium hydrate (neutral hydrate).

(2) Calcined $TiO_2$.

Cation exchange resins in the hydrogen form and anion exchange resins in the hydroxyl form were employed in the examples to follow, the former sulfonic acid types and the latter polyamine and strongly basic Type I or Type II anion exchange resins as identified heretofore. Use of the former would generally remove cations and the use of the latter would generally remove anions (which can contain metals in the form of anionic complexes). The ion exchangeable impurity is thus replaced with a hydrogen or a hydroxyl ion. Resins in the metal or salt forms are also applicable.

A single treatment in accordance with this invention involves treatment with one resin—say anion exchange resin, which would remove adsorbed acid from the $TiO_2$ plus anionic complexes. A dual treatment would be the above, followed by a cation exchange resin treatment (after separation of $TiO_2$) which would remove metal cations and replace them with hydrogen. The lowered acid from the first treatment allows the second treatment to be more effective. In some cases the slurry was merely dewatered after separation of resin. In others the mixture was washed with high resistance water, resin separated and slurry dewatered. Good results were obtained, no matter which treatment was employed first. Some runs were made with more than two treatments.

The pigmentary slurry treated with an ion exchange resin can be tested with pH meter to determine the effect of the treatment. pH is measured by an electronic meter which compares the hydrogen potential on glass electrode referred to a standard calomel cell. Increase of pH is an indication of increase in basic character of mixture or a reduction in the hydrogen ion concentration (acid character); decrease of pH is the reverse. In acid removal from pigment, rising pH means reduction of hydrogen ion concentration, effected by replacing ($SO_4^=$) ions on pigment with (OH) ions from the resin. When a salt is split, there is a substitution of ions resulting in a change of pH up or down depending on whether resin used is anionic or cationic respectively and the magnitude of the change on type and quantity of salt present. The first treatment will usually result in residual acid or alkali, the second treatment, in turn, removes this. Since the resin has a pH of its own there will be a variable reading, depending on the relative motion and concentration of the ion exchange resin past the electrodes.

An effective method for determining the efficacy of the treatment herein described is by measurement of the resistance of the treated aqueous slurries. The resistance of a solution is due to the presence of ionizable substances and depends on the activity and quantity of ions present. A high resistance is indicative of lack of ionizable substances but the relation is not linear. The resistance of slurries and liquids is measured in a resistance cell usually by a Wheatstone bridge circuit. The resistance of a solid is arbitrarily determined by boiling a fixed weight of the solid and a fixed weight of minimum resistance (250,000 ohms) water for 5 minutes with agitation. The slurry is cooled, filtered and resistance of filtrate measured in the regular cell. Sometimes conductivity is used instead of resistance; one is the reciprocal of the other.

After separation of the resin from a treated slurry, the resistance of the filtrate will be somewhat less than the mixture itself. This is due to the gradual diffusion of ions from the solid to the liquid, a relatively slow process, which would have been sequestered by the resin had it been present a relatively fast process. For high resistance material, part of this drop may be also due to contamination from equipment. The test resistance of solids may be either greater or less than the resistance of solution from which it was made depending on the order of solution resistance and resistance of water used in making the test.

The following examples are offered to illustrate the process of this invention:

EXAMPLE 1

Five hundred milliliters of a "first acid cake" (Rutile-yielding type) and 500 ml. of water were mildly agitated with 802 grams of wet, drained strongly basic anion exchange resin of the quaternary ammonium type in the hydroxyl form (OH) for 3½ hours at room temperature. The pH of the slurry rose from 0.4 to 8.9 indicating a reduction in the hydrogen ion concentration effected by replacing ($SO_4$) ions on the pigment with hydroxyl ions from the resin. The resin was conveniently separated with a 100 mesh screen and the slurry filtered and the resulting cake was split in two halves. The first half was oven dried. The second half was agitated mildly with 328 grams of wet, drained cation exchange resin of the sulfonic acid type in the hydrogen form for ½ hour, the pH dropping to 5.7. The resin was thereafter screened off as above and the remaining slurry dewatered and dried. The anion exchange resin treated sample, the anion and cation exchange resin treated sample, and a control were then subjected to a resistance test with the results shown in Table I below. The ion exchange resins used in this example were prepared using the procedure of Example 1 of U.S. Patent 2,366.007.

*Table I*

|  | Control | Anion exchange resin treated | Anion and cation exchange resin treated |
| --- | --- | --- | --- |
| Ohms resistance, dried cake | 250 | 13,000 | 33,000 |
| Filtrate | 250 | | 205,000 |
| Chromium | Present | | Absent |

Rise of pH in the treatment with anion exchange resin indicates removal of acid plus splitting of some salt to develop basic character (pH greater than 7) of mixture. Rise of resistance is indicative of removal of ionizable material (mainly sulfuric acid). This was accomplished solely by the resin; no wash was used.

Drop of pH in the treatment with cation exchange resin indicates neutralization of base developed in the first treatment. Rise of resistance shows still further removal of ionizable impurities. The great increase of resistance of filtrate over solid resistance illustrates the surface activity of $TiO_2$, the distribution of the ionized material between solid and liquid, the slow diffusion of the ionized material from the intricate and highly active surface and its rapid removal by the resin in the liquid phase.

EXAMPLE 2

Two hundred fifty milliliters of a "second acid cake" of titanium hydrate and an equal volume of water were mildly agitated at room temperature for 40 minutes with 253 grams of the strong anion exchange resin of Example 1. The pH rose from 1.3 to 8.3. The resin was separated by screening through a 100 mesh screen and the slurry was dewatered and dried overnight at 100° C. For comparison, an untreated control from the source was carried along. Table II below shows the difference in ion impurity content of these samples.

*Table II*

|  | Treated | Untreated |
| --- | --- | --- |
| $H_2SO_4$ content, $TiO_2$ basis, percent | Absent | 5.48 |
| $P_2O_5$ content, $TiO_2$ basis, percent | .15 | .19 |
| Specific resistance, ohms | 7,900 | |

These two samples were thereafter treated and calcined and it was found that the treated sample calcined easier and faster at lower temperatures and resulted in a pigment of better color, brightness and tint than the control sample.

In the above, rise of pH is indicative of removal of $H_2SO_4$ and this is confirmed by chemical analysis. Twenty-five percent (25%) of the $PO_4^=$ ion was also removed from the $TiO_2$. These changes are due solely to resin treatment; no wash was employed.

EXAMPLE 3

One thousand milliliters of a "second acid cake" (rutile-inducing type) of titanium hydrate hydrolysate and 1000 ml. of water were mildly agitated at 39° C. for 70 minutes while gradually adding a strong anion exchange resin as in Example 1, as follows:

| | Grams |
| --- | --- |
| Resin (wet drained) in (OH) form 3.7 pH | 183 |
| Resin (wet drained) in (OH) form 4.0 pH | 184 |
| Resin (wet drained) in (OH) form 5.0 pH | 269 |
| Resin (wet drained) in (OH) form 7.7 pH | 269 |
| Total | 905 |

The mixture was then allowed to stand overnight, then agitated for one hour during which time the pH dropped back to 7.2. The mixture was screened through 100 mesh screen to remove the resin and filtered—no wash. One quarter of the cake was dried and retained as sample and designated as $X_1$. The remaining ¾ of cake was slurried with water and mildly agitated at 40° C. for 70 minutes while gradually adding cation exchange resin of the sulfonic acid type.

| | pH | |
| --- | --- | --- |
| | Stir | Stand |
| Start | 7.0 | 8.0 |
| 165 grams (wet drained) resin in (H) form | 4.5 | 6.3 |
| 124 grams (wet drained) resin in (H) form | 4.5 | 5.5 |
| 155 grams (wet drained) resin in (H) form | 3.8 | 5.2 |

The mixture was allowed to stand over night, then agitated at 40° C. for one hour while adding

|  | pH | |
|---|---|---|
|  | Stir | Stand |
| 206 grams (wet drained) resin in (H) form | 3.8 | 4.5 |
| 153 grams (wet drained) resin in (H) form | 3.8 | 4.5 |

The mixture was then screened through a 100 mesh screen to remove the resin and filtered—no wash. One-third of cake was dried and retained and designated as $X_2$.

The remaining ⅔ of the cake was slurried with water, heated to 86° C. with stirring for one hour then cooled to 40° C. and treated over a two hour period with an anion exchange resin as in Example 1 as follows:

|  | pH | |
|---|---|---|
|  | Stir | Stand |
| Start | 4.5 | 5.0 |
| 55 grams (wet drained) resin in (OH) form | 6.0 | 7.0 |
| 80 grams (wet drained) resin in (OH) form | 6.3 | 7.4 |
| 65 grams (wet drained) resin in (OH) form | 6.4 | 7.4 |
| After standing overnight | 6.3 | 7.2 |

The resin was separated with a 100 mesh screen and the slurry filtered. The dewatered cake was slurried again with water and treated over a period of one hour with a cation exchange resin as above as follows:

|  | pH | |
|---|---|---|
|  | Stir | Stand |
| Start |  | 6.5 | 7.0 |
| 61 grams (wet drained) resin in (H) form | 4.5 | 5.0 |
| 52 grams (wet drained) resin in (H) form | 4.3 | 4.8 |

The resin was separated again with a 100 mesh screen and the slurry filtered. The cake was dried at 105° C. and identified as $X_3$.

As a control, a hydrolysis sample of the same titanium hydrate was dewatered and dried at 105° C. and designated as $X_4$.

The following table shows the results:

*Table III*

| No. | Treatment (no wash) | Resistance, ohms | | |
|---|---|---|---|---|
|  |  | Filtrate | Treated (solid) | Control (solid) |
| $X_1$ | Anion exchange resin 39° C. | 21,200 | 5,100 | 160 |
| $X_2$ | Anion exchange resin 39° C.; cation exchange resin 40° C. | 51,500 | 8,200 | 160 |
| $X_3$ | Anion exchange resin 39° C.; cation exchange resin 40° C.; solid heated 86° C; anion exchange resin 40° C. | 54,000 |  | 160 |
| $X_4$ | Anion exchange resin 30° C.; cation 40° C., twice. | 98,000 | 48,000 | 160 |

Progressive improvement can be noted in the resistance of both the filtrate and the solid, indicating removal of ionized impurities. The effect of adding anion exchange is to raise pH; of adding cation exchange resin is to lower the pH.

EXAMPLE 4

In a manner similar to Example 3 above, a titanium hydrolysate for neutral hydrate preparation was treated with a polyamine type anion exchange resin, a strongly basic Type II anion exchange resin and finally a combination of strongly basic Type II followed by a sulfonic acid cation exchange resin. The control was untreated pigment.

*Table IV*

| No. | Treatment | Resistance, ohms | | |
|---|---|---|---|---|
|  |  | Filtrate | Treated (solid) | Control (solid) |
| $Y_1$ | Polyamine type anion exchange resin room temperature. | 15,000 | 3,500 | 270 |
| $Y_2$ | Strongly basic anion exchange resin room temperature. | 17,000 | 32,000 | 270 |
| $Y_3$ | Strongly basic cation exchange resin room temperature. | 14,100 | 29,500 | 270 |
|  | Neutralized and wash control |  | 1,950 |  |

Manufacturing procedure of special neutral hydrate calls for neutralization of second acid cake with ammonia and washing out the salt with water. All of the three treated samples with no wash showed less impurity content than the standard product. Strongly basic anion exchange resin shows considerable improvement over the polyamine anion exchange resin. The presence of sulfuric acid in the control is shown by the low resistance.

EXAMPLE 5

The procedure in this example is identical with that of the previous examples except that finished rutile pigment was used instead of the 1st or 2nd acid cakes. There is only slight salt content to this pigment (contrasted with the acid cakes which contain about 9%, $H_2SO_4$) and consequently much less resin is required. Nine dual treatment runs were made under specified conditions with results tabulated below. Note the multiple use of the resins from run 4 on. This is possible because the quantity of material to be removed is small and the resin has not been exhausted. Ionizable content on pigment in every case is considerably less than control (7000 ohms).

In a typical run (run 1), 500 ml. of rutile pigment, pH 7.3, 2000 ohms resistance, and 500 ml. of water were stirred mildly for 40 minutes at room temperature with 403 grams, wet drained strongly basic anion exchange resin (quaternary ammonium type) in the hydroxyl form. The pH rose from 7.3 to 10.4. The resin was then screened off dewatered and displacement wash made. The cake (under second treatment) was reslurried with water and agitated mildly for 30 minutes with 158 grams of wet drained sulfonic acid type cation exchange resin in the hydrogen form. The pH dropped from 9.5 to 5.5. The resin was screened off again, the slurry dewatered and displacement was made. The cake was dried (oven 105° C.) laboratory micronized and compared with control paint grinds.

The same procedure was employed for runs 2 to 9, but the treating order was reversed (runs 2 to 7), the temperatures elevated (runs 3 to 6, 8 and 9) and the pigment was boiled with water before the treatment (run No. 6). The resins were reused six times without regeneration.

Resistance and pH measurements were made on starting slurry to serve as a sort of control and also to illustrate the tests and their significance. A starting slurry was dewatered and the resulting cake was dried. The resistance of the dried cake was 12,000 ohms. The resistance of the slurry, i.e., 500 ml. of rutile pigment and 500 ml. of water (run No. 1), was 2,000 ohms, reflecting the influence of the liquid phase. The resistance of this slurry increased to 2,900 ohms. When diluted 100% by volume with distilled water, thereby reflecting the influence of the high resistance of the distilled water used for dilution.

Table V

| Run No. | First treatment | | | Second treatment | | | Dried cake |
|---|---|---|---|---|---|---|---|
| | Mixture | Filtrate | Wash | Mixture | Filtrate | Wash | |
| 1 | Anion exchange resin (OH) form. 10.4 | Room temp. 10.3 11,500 | | Cation exchange resin (H) form. 5.5 195,000 | Room temp. 6.9 43,500 | 62,000 | (1) |
| pH Resist. | | | | | | | |
| 2 | Cation exchange resin (H) form. 4.4 19,000 | 5.2 19,500 | Room temp. 5.3 19,000 | Anion exchange resin (OH) form. 7.7 | 7.0 440,000 | Room temp. 6.8 150,000 | 2 44,000 3 35,000 |
| pH Resist. | | | | | | | |
| 3 | Cation exchange resin (H) form. 3.6 | 4.6 17,000 | 38° C | Anion exchange resin (OH) form. 7.3 475,000 | 10.5 92,000 | 38° C | 2 19,000 3 28,000 |
| pH Resist. | | | | | | | |
| 4 | Cation exchange resin (H) form (used). 3.9 | 49,000 | 38° C | Anion exchange resin (OH) form (used). 7.3 | 5.9 120,000 | 38° C | 2 12–20,000 3 38,000 |
| pH Resist. | | | | | | | |
| 5 | Cation exchange resin (H) form (used). 3.8 | 4.5 355,000 | 38° C | Anion exchange resin (OH) form (used). 7.5 | 10.3 260,000 | 38° C | 2 64,000 3 47,000 |
| pH Resist. | | | | | | | |
| 6 | Cation exchange resin (OH) form (used). 3.4 | 4.5 26,500 | 70° C | Anion exchange resin (OH) form (used). 8.0 | 6.7 215,000 | 38° C | 2 82,000 3 26,000 (4) |
| pH Resist. | | | | | | | |
| 7 | Cation exchange resin (H) form (used). 4.4 | 5.0 20,500 | Room temp. | Anion exchange resin (OH) form (used). 8.0 | 7.4 235,000 | 38° C | (5) 3 27,000 (5) |
| pH Resist. | | | | | | | |
| 8 | Anion exchange resin (OH) form (used). 9.6 | 7.9 23,000 | 38° C | Cation exchange resin (H) form (used). 5.1 | 7.8 170,000 | 70° C | 3 36,000 (6) |
| pH Resist. | | | | | | | |
| 9 | Anion exchange resin (OH) form (used). 9.9 | 9.6 20,000 | 38° C | Cation exchange resin (H) form (used). 6.2 | 7.0 115,000 | 21° C | 3 58,000 (6) 3 40,000 |
| pH Resist. | | | | | | | |

[1] Rutile, 6–10,000 ohm average 7,000 ohms. [2] Unmicronized. [3] Micronized. [4] Feed boiled 3 hours before treatment. [5] Slurry not flocculated at finish. [6] Slurry flocculated at finish.

The superiority of the treated pigment is indicated in paint grind tests given below. The numbers correspond to run numbers of columns —.

| Number | Paint color | Bake | Opacity |
|---|---|---|---|
| Control | Std. | Std. | Std. |
| 1 | +1 | +1 | +2 |
| 2 | +2 | +1 | +2 |
| 3 | +1 | +2 | +2 |
| 4 | +1 | +2 | +2 |
| 5 | +2 | +2 | +2 |

As previously mentioned, in the conventional $TiO_2$ process, impurity content of calciner feed is maintained at an acceptable minimum value, rather than removed entirely, by extensive water washing, acid treatment and further washing. Due to the large surface area of the titanium hydrate and its activity, once a nominal impurity level is reached, it becomes more and more difficult to reduce this level further, and this operation greatly restricts the capacity of the filter.

In the rotary calciner, three operations—drying, preheating and calcining—are performed obtaining a certain degree of efficiency, albeit at sacrifice elsewhere, by utilizing the same gas progressively for all three operations. High temperatures are maintained in the calcining zone, to develop pigmentary properties, intermediate zone serves as preheat; in the last zone, the volatiles are removed from the feed. It is necessary to keep the exhaust temperature well above (because of poor mixing of gases and solid) the dewpoint of $SO_3$, to prevent accumulation of sulfuric acid in the kiln. The required calcining temperature fixes the fuel mixture (i.e., fuel/air ratio and consequently gas temperature) but the quantity of this gas mixture required is controlled by the amount of water and acid to be removed from the feed (and also by the stack gas temperature). The capacity of the kiln is determined principally by its diameter and length (grossly oversimplified); but for given dimensions, the operating capacity would be controlled by gas velocity in the kiln and volatile content of the feed. It should be mentioned that proper calciner operation is ticklish and difficult requiring strict maintenance of the individual zones in the face of changing quantity and quality of feed and requirements for optimum physical properties.

With this background, it can be seen that quality and uniformity is improved by removal or reduction of impurity level in $TiO_2$ cake. Concurrent with this improvement, filter capacity is increased in the first filter by virtue of less washing and the second filter operation is eliminated entirely. This results in reduced water use, reduced acid waste and yield improvement. Maintenance of filter pumps and auxiliaries is also reduced by virtue of elimination of sulfuric acid content of $TiO_2$ (about 9%—$TiO_2$ basis) and elimination of sulfuric acid treating step. A considerable reduction in safety hazard also results.

Calcination can be effected with no sulfuric acid and at lower temperatures. With no corrosives present, waste heat salvage for other purposes is no longer a problem and efficiency increases due to lower exhaust temperatures. While calciner capacity can be considerably increased, more efficient drying can be utilized (with corrosion disposed of) and the dried cake fed into a far smaller kiln where better quality and uniformity results from better control in elimination of the drying step. Yield can also be increased because high gas velocities (and high dusting losses) necessary for drying out the cake do not exist. With greatly reduced fuel requirement at calcination (over 90% of requirement is used to evaporate water alone) there is only a fraction of the fuel ash produced to contaminate the pigment.

With the elimination of sulfuric acid from the cake, there are no sulfur gases emanating from the kiln and consequently no air pollution results and there is no reason for installing Cottrell Precipitators, scrubbing tower and other auxiliaries. In the regeneration of the polyamine type resin, the sulfuric acid removed can be recovered as saleable byproduct ammonium sulfate with good ammonia efficiency. Introduction of dry feed to the kiln results in less spall and breakage in the calciner thereby improving product quality, reducing maintenance and increasing the life of the kiln.

In the production of a neutral $TiO_2$ hydrate, it is desired to neutralize the adsorbed acid and wash the salts from the titanium hydrate. By anion exchange resin treatment both steps are accomplished simultaneously, along with additional impurity removal without the necessity for extensive washing. As in the case above, sulfuric acid can be salvaged as ammonium sulfate with high ammonia efficiency. A number of other advantages mentioned above also apply.

In another aspect, ion exchange resin can be utilized to remove residual salts from calcined and treated pigment. This results in improved properties of product including higher resistance, and permits much greater control and uniformity.

Similar advantages can be obtained in production of rutile seed in the washing operations.

The same procedure can be applied to removal of ionizable impurities from insoluble materials such as cadmium colors, white lead, mercury colors, etc. Resort can be had to modifications and adaptations of this invention falling within the scope of the appended claims.

Having thus described my invention I claim:

1. A process for removing an adhering, ion exchangeable contaminant from a titaniferous solid selected from the group consisting of titanium hydrate and titanium dioxide which consists essentially of contacting an aqueous slurry of said titaniferous solid with ion exchange resin, and recovering as product said titaniferous solid reduced in said contaminant.

2. The process of claim 1 wherein said ion exchange resin contains monovalent ions exchangeable with said contaminant.

3. A process for removing an adhering, ion exchangeable contaminant from solid titanium hydrate which consists essentially of contacting an aqueous slurry of said titanium hydrate with anion exchange resin in the hydroxyl form, and recovering as product said solid titanium hydrate reduced in said contaminant.

4. A process for removing an adhering ion exchangeable contaminant from solid titanium hydrate which consists essentially of contacting an aqueous slurry of said titanium hydrate with a cation exchange resin of the sulfonic acid type in the hydrogen form, and recovering as product solid titanium hydrate reduced in said contaminant.

5. A process for removing an adhering, ion exchangeable contaminant from calcined titanium dioxide which consists essentially of contacting an aqueous slurry of said titanium dioxide with cation exchange resin of the sulfonic acid type in the hydrogen form, and recovering as product said titanium dioxide reduced in said contaminant.

6. A process for removing adhering ion exchangeable contaminants from solid titanium hydrate which consists essentially of contacting an aqueous slurry of said titanium hydrate with an anion exchange resin in the hydroxyl form, separating the resulting slurry of titanium hydrate from said anion exchange resin, then contacting said resulting slurry with a cation exchange resin of the sulfonic acid type in the hydrogen form, and recovering titanium hydrate reduced in said contamiants.

7. A process for removing adhering, ion exchangeable contaminants from calcined titanium dioxide which consists essentially of contacting an aqueous slurry of acid titanium dioxide first with an anion exchange resin in the hydroxyl form, separating the resulting slurry of titanium dioxide from said anion exchange resin, then contacting said resulting slurry with a cation exchange resin of the sulfonic acid type in the hydrogen form, and recovering titanium dioxide reduced in said contaminants.

References Cited in the file of this patent

UNITED STATES PATENTS 2,892,679     Fuentevilla _____ June 30, 1959

OTHER REFERENCES

Samuelson: "Ion Exchangers in Analytical Chemistry," pages 73, 74, 93, 98, 99 and 177, John Wiley & Sons, Inc., N.Y.

Ind. and Eng. Chem.: vol. 41, No. 3, page 450, March 1949; vol. 43, No. 5, May 1951, page 1090.

"Insoluble Sodium Hydroxide," published in 1953 by Rohm & Haas Co., Philadelphia, Pa.

Kressman article in Mfg. Chemist, vol. XXIII, No. 4, April 1952, page 151.

UNITED STATES PATENT OFFICE
CERTIFICATE OF CORRECTION

Patent No. 3,063,807                                     November 13, 1962

Lester A. Kenworthy

It is hereby certified that error appears in the above numbered patent requiring correction and that the said Letters Patent should read as corrected below.

Column 1, line 46, for "Caumenberg" read -- Cauwenberg --; column 5, line 25, for "present a" read -- present-a --; column 7, "Table III", after entry "$X_4$" insert an open parenthesis before "Anion", and after "40° C." strike out the comma and insert a closing parenthesis; column 12, line 24, for "acid" read -- said --.

Signed and sealed this 30th day of April 1963.

(SEAL)
Attest:

ERNEST W. SWIDER                                           DAVID L. LADD
Attesting Officer                                              Commissioner of Patents